(No Model.)

P. DION.
WHEEL.

No. 345,218. Patented July 6, 1886.

Witnesses
A. D. Stewart
H. F. Shumer

Inventor
Peter Dion
by
C. M. Mallory
Attorney

UNITED STATES PATENT OFFICE.

PETER DION, OF TOLEDO, OHIO, ASSIGNOR OF ONE-SIXTEENTH TO E. D. SMITH, OF SAME PLACE.

WHEEL.

SPECIFICATION forming part of Letters Patent No. 345,218, dated July 6, 1886.

Application filed December 24, 1885. Serial No. 186,615. (No model.)

*To all whom it may concern:*

Be it known that I, PETER DION, a citizen of the United States, residing at Toledo, in the county of Lucas and State of Ohio, have invented a new and useful Wheel, of which the following is a specification.

My invention relates to improvements in wagon-wheels in which the spokes are detachable and adjustably held in position; and the objects of my improvements are, first, to provide a wheel wherein broken or defective spokes may be easily and quickly replaced without removing the tire or felly from wheel or wheel from wagon or vehicle; second, to afford an adjustment in a wheel whereby the resetting of the tire in dry or wet weather is avoided; third, to provide a cheap durable wheel of simplified construction. I attain these objects by the mechanisms illustrated in the accompanying drawings, in which—

Figure 1:
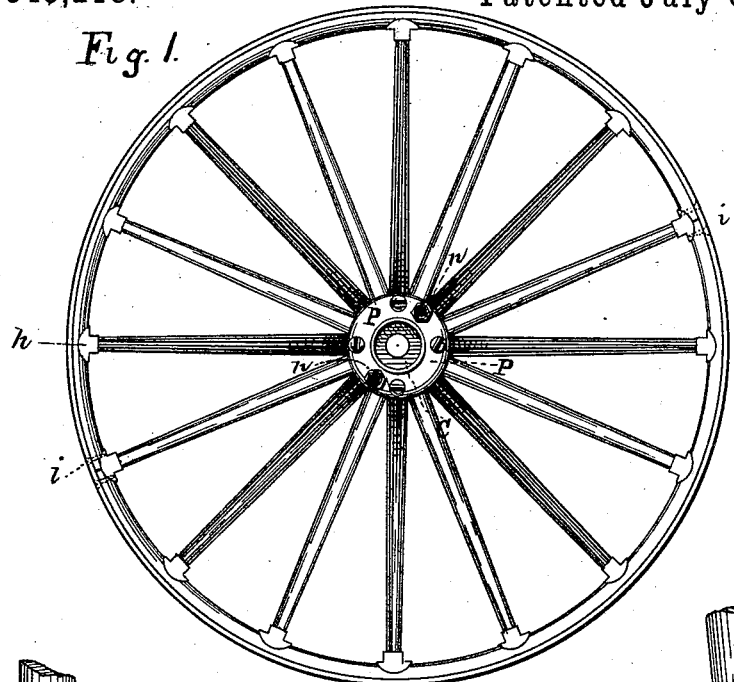
Figure 3:
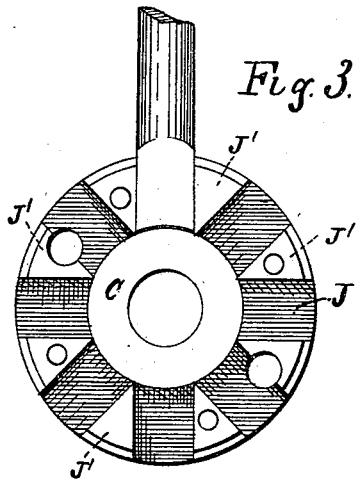
Figure 2:
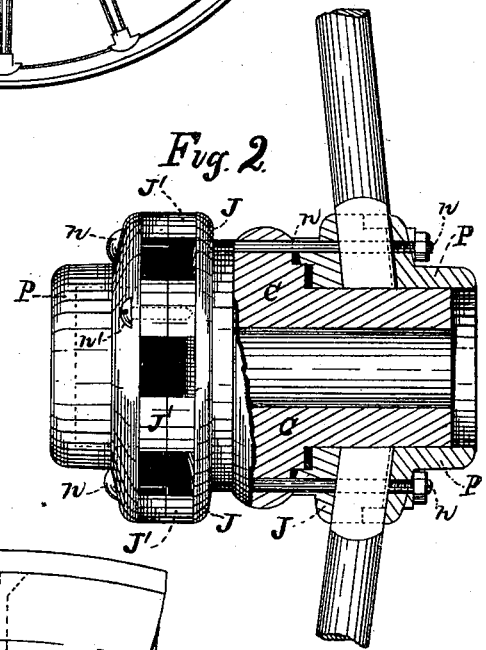
Figure 4:
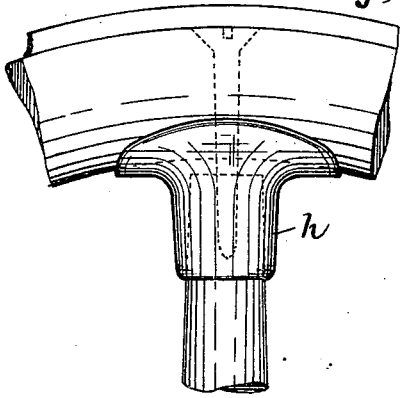

The entire wheel is shown in Figure 1. Fig. 2 is a sectional view of the hub, showing the adjusting bolts and flanges. Fig. 3 represents one of the inner flanges. Fig. 4 is a spoke-socket with felly, tire, and a spoke shown in section.

Similar letters refer to similar parts throughout the different views.

The hub, C, provided with central rib or bead, is adapted to receive at either end a pair of flanges, which are held in position by adjusting-bolts $n$. The inner flanges, J, are provided with lugs J', which (when cap P is put on) form mortises for the spokes. The outer flanges or caps, P, project over the hub C, as shown in Fig. 2, serving partly as sand-rims, and are secured to the inner flanges by screws $n'$, thus holding the spokes in place. The bolts $n$ hold the outer and inner pair of flanges in position or proper relation with the hub, and also serve as means for tightening the tire in case of dry weather or loosening the same in wet weather. A nut may be used outside of the flanges on the end of a projecting hub, to accomplish the same result, in place of said adjusting-bolts.

The socket $h$, Fig. 4, allows a spoke to be readily removed or replaced without removing the tire, which is easily and quickly done by first removing the outer flange or cap P.

The screw shown in dotted lines in Fig. 4 is held stationary by the tire while spokes are being taken out and replaced.

I am aware that prior to my invention various styles of wheels containing detachable and adjusting flanges have been used. I therefore do not claim such a combination, broadly; but What I do claim, and desire to secure by Letters Patent, is—

In a wheel, the combination of the hub C, adapted to receive at either end an adjusting-flange and follower, and having a central enlargement, through which the flange or tension-bolts $n$ pass, and the flanges J, provided with detachable caps or followers P, wherein broken or defective spokes may be readily removed and replaced without resetting tire, substantially as shown, and for the purpose specified.

PETER DION.

Witnesses:
H. F. SHUNCK,
A. D. STEWART.